Patented July 22, 1924.

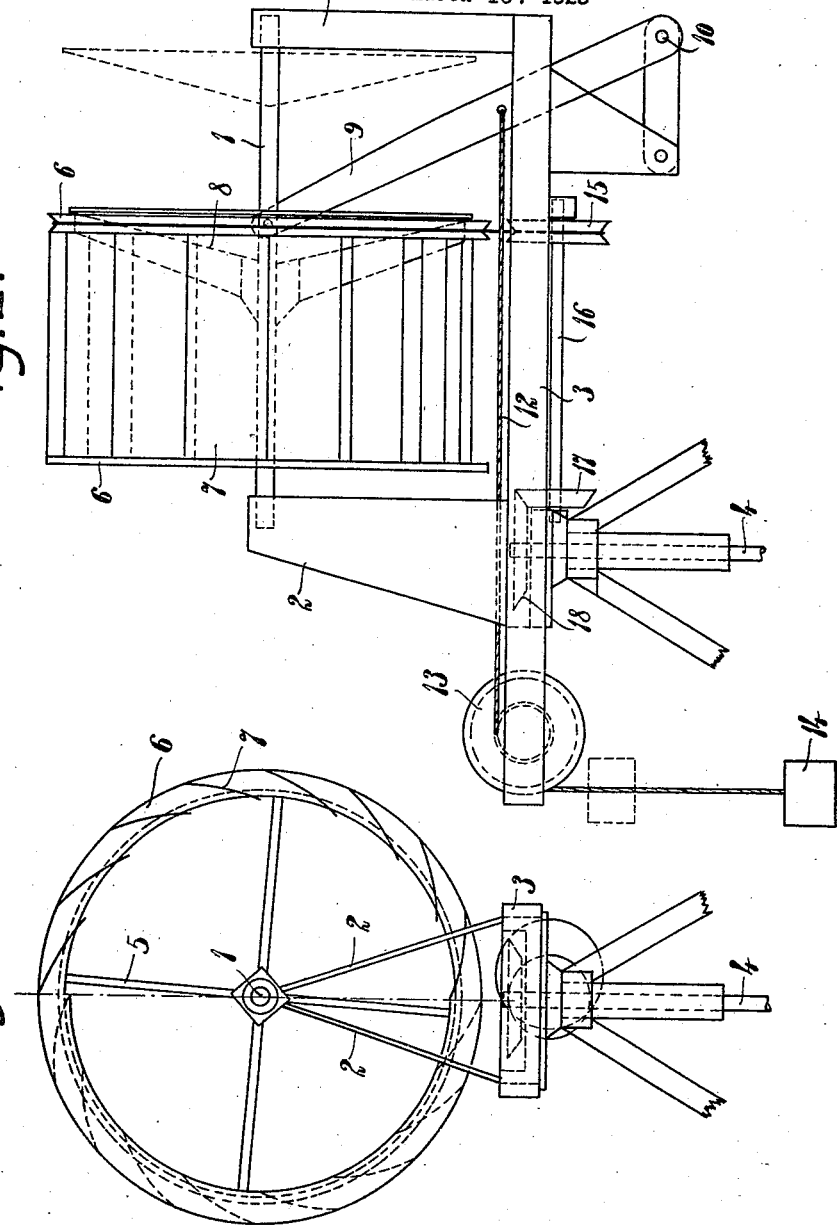

1,502,433

UNITED STATES PATENT OFFICE.

JOHAN ALFRED JOHANSON, OF STOCKHOLM, SWEDEN.

WINDMILL.

Application filed March 16, 1923. Serial No. 625,543.

*To all whom it may concern:*

Be it known that I, JOHAN ALFRED JOHANSON, a citizen of the Kingdom of Sweden, residing at Stockholm, Sweden, have invented new and useful Improvements in Windmills, of which the following is a specification.

This invention relates to wind mills of the kind having a horizontal shaft and a series of vanes or blades symmetrically surrounding said shaft. In the well known design of such wind mills said blades or vanes radiate from said shaft and are set at an angle to the direction of the wind. The object of this invention is to provide a wind mill in which the vanes or blades are arranged parallel to the shaft and form together a cylindrical cage open at one end and closed at its other end by a bottom causing the wind entering through the open end of the cage to pass out through the spaces between the vanes thereby rotating the cage. An enlarged pressure area is gained by this arrangement, as compared with windmills having radially radiating vanes, which for theoretical as well as practical reasons, cannot exceed a certain size, and the pressure and suction are so well taken advantage of that the effect of the wind is utilized to a much larger extent than has heretofore been possible.

The improved wind mill is diagrammatically shown in the accompanying drawing, in which Fig. 1 is an end view of the wind mill, and Fig. 2 is a side elevation thereof.

With reference to the drawing a horizontal shaft 1 is mounted in studs 2 raising from a frame 3, which is mounted to rotate around a vertical shaft 4. The shaft 1 carries by means of a number of radial arms 5 two annular rings 6 between which a number of vanes 7 parallel to the shaft 1 are rigidly inserted. The vanes 7 are inclined relatively to the radius. The vanes 7 together with the said two rings 6 form a cylindrical cage. Said cage is open at its end adjacent to the shaft and is closed at its opposite end by means of a loose conical bottom 8 slidably mounted on the shaft 1. Said bottom 8 is pivotally connected to the free end of a lever 9, mounted at 10 and connected, as at 11, to a rope or the like 12 hung over a guide pulley 13 and carrying a weight 14 which tends to maintain the lever 9 with the bottom 8 in close engagement with the cylindrical cage.

One of the annular rings 6 is shaped to form a rope pulley which may be connected by an appropriate rope (not shown) to another rope pulley 15 on the shaft 16 which also carries a bevel gear 17 meshing in a bevel gear 18 on the vertical shaft 4.

The operation of the wind mill described is as follows: Due to the positioning of the cylindrical cage at one and the same side of the shaft 4 the cage will act as a vane holding itself into the wind so that the shaft 1 will be in the direction of the wind with the open end of the cage directed towards the wind. The wind entering the cage strikes the conical bottom 8 of the cylinder and is turned by said bottom in a radial direction, and caused to escape between the vanes 7 while exerting a pressure on the vanes so as to set the cylinder into rotation. The power of the wind is thereupon transmitted over shaft 16 to the vertical shaft 4. When the pressure of the wind increases to an extent to exceed the pull exerted by the weight 14, the bottom 8 is forced back and opens the cylinder thereby allowing whole or a portion of the air current to pass freely through the cylinder, till the weight 14 again balances the pressure of the wind.

It should be noted that the bottom 8 may be attached to one of the annular rings 3, in which case the vanes 7 may be movably mounted in the rings 3 and adjustable either by hand or by some automatic means.

The bottom 8 may be cone shaped, as shown, or have some other appropriate shape so as to decrease the resistance or friction to the air current to a minimum.

The end of the cylindrical cage closed by the bottom 8 may, if desired, be next to the vertical shaft 4, in which case the frame 3 must be provided with a rudder.

What I claim is:—

1. A wind mill, comprising in combination a horizontal shaft an open ended cylindrical cage on said shaft, the periphery of said cage being formed by vanes to be operated by the wind, a loosely mounted bottom to close one end of said cage, and means to operate said bottom so as to maintain same in closed position during a light wind but opening same more or less during a stronger wind to allow the excess pressure to escape without operating the vanes.

2. A wind mill, comprising in combination a horizontal shaft, an open ended cylindrical cage on said shaft, the periphery of said cage being formed by vanes to be operated by the wind, a bottom mounted to slide on said horizontal shaft, and means operated by a weight to cause said bottom to close one end of said cage during light wind but opening said bottom more or less during a stronger wind.

3. A wind mill, comprising in combination a horizontal shaft, an open ended cylindrical cage on said shaft, the periphery of said cage being formed by vanes to be operated by the wind, a bottom mounted to slide on said horizontal shaft, means operated by a weight to cause said bottom to close one end of said cage during light wind but opening said bottom more or less during a stronger wind, a vertical operating shaft, and means operatively connecting said cage to said vertical operating shaft.

In testimony whereof I have signed my name.

JOHAN ALFRED JOHANSON.